United States Patent [19]

Owens

[11] Patent Number: 4,635,870

[45] Date of Patent: Jan. 13, 1987

[54] RELL HUB FOR A MAGNETIC TAPE DRIVE

[75] Inventor: John C. Owens, Arvada, Colo.

[73] Assignee: Storage Technology Corporation, Louisville, Colo.

[21] Appl. No.: 654,327

[22] Filed: Sep. 25, 1984

[51] Int. Cl.[4] .................. B65H 18/10; B65H 75/24; G11B 15/32
[52] U.S. Cl. .................. 242/68.3; 242/72.1
[58] Field of Search .................. 242/68-68.3, 242/72, 72.1, 201-204

[56] References Cited

U.S. PATENT DOCUMENTS

| 3,366,343 | 1/1968 | Messamer et al. | 242/68.3 |
| 3,532,286 | 10/1970 | Mallette | 242/68.3 |
| 3,542,305 | 10/1970 | Feierabend | 242/68.3 |
| 3,712,561 | 1/1973 | Williams | 242/68.3 |
| 4,284,250 | 8/1981 | Plachy et al. | 242/68.3 |
| 4,397,428 | 8/1983 | Smith | 242/201 |

Primary Examiner—John M. Jillions
Attorney, Agent, or Firm—Woodcock Washburn Kurtz Mackiewicz & Norris

[57] ABSTRACT

A locking hub for the file reel of a magnetic tape drive has three arcuate locking members which move radially outward to engage the annular peripheral center surface of the file reel throughout almost its entire center periphery. Camming surfaces on the actuator mate with cam surfaces at the center of each locking member so that the entire locking member is moved radially outward.

9 Claims, 4 Drawing Figures

RELL HUB FOR A MAGNETIC TAPE DRIVE

BACKGROUND OF THE INVENTION

This invention relates to magnetic tape drives and more particularly a locking mechanism for a file reel hub having improved locking characteristics.

In magnetic tape drives, tape is driven between a file reel and a machine reel past magnetic read/write heads. The file reels are removable and replaceable so that different files of magnetic tape can be processed. In high performance tape drives, the tape is accelerated from stop to a relatively high speed very quickly and decelerated at a like rate by motors driving the file and machine reels. This requires a non-slipping connection between the hub and the reels. Providing such a non-slipping connection is a particular problem for the file reel which must be easily removable and replaceable.

U.S. Pat. No. 4,397,428 - Smith, shows an actuator and locking mechanism which has been used successfully on tape drives, but slippage has been experienced. Any slipping that occurs causes read/write errors while the tape drive is in operation. In the hub of the above-identified patent, six pivoted "shoes" are cammed outwardly in a lever-like motion to engage the file reel. A pad of silicon rubber at the extremity of each lever-like shoe engages the peripheral surface at the center of the file reel. The engagement surface is relatively limited, occasioning the slippage problem and also resulting in accentuated wear and failure of the locking mechanism.

It is an object of the present invention to provide a locking hub for a file reel which has locking surfaces which engage the opening in the file reel throughout substantially the entire periphery.

It is another object of the present invention to provide a file reel having improved locking and wear characteristics.

SUMMARY OF THE INVENTION

In accordance with the present invention, three arcuate locking members have circumferential surfaces of a friction material which engages the file reel throughout substantially the entire periphery of the opening in the file reel. An actuator cams the locking members to move radially outward into locking engagement. The actuator has inclined camming surfaces which engage rounded surfaces at the center of each of the locking members. By moving the locking member in a radial direction with respect to its entire circumferential surface, engagement is achieved between the entire circumferential surface and the peripheral surface in the opening of the file reel. Friction material such as silicon rubber extends throughout the entire circumferential surface of the locking member. This greatly increases the surface area of engagement and hence the static coefficient of friction between the hub and the file reel. In this manner, improved locking characteristics, less slippage, and improved wear characteristics are obtained.

The foregoing and other objects, features and advantages of the invention will be better understood from the following detailed description and appended claims.

DESCRIPTION OF THE PREFERRED EMBODIMENT

Figure 1:
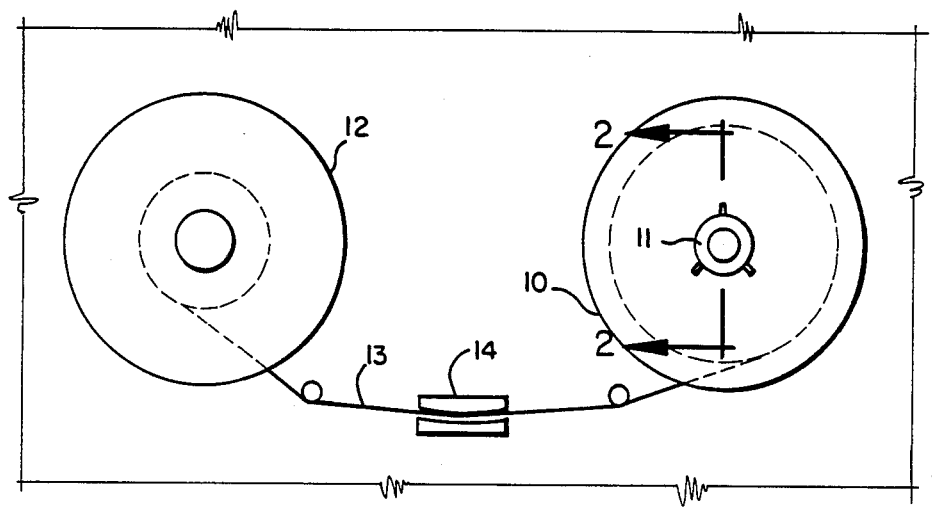
FIG. 1 is a schematic view of a magnetic tape drive with which the hub of the present invention is used.

FIG. 1 shows a schematic view of a magnetic tape drive in which a file reel 10 is detachably mounted on the hub 11 of the present invention. A machine reel 12 is permanently mounted on the drive. Magnetic tape 13 is driven between file reel 10 and machine reel 12 past a read/write head 14.

Figure 3:
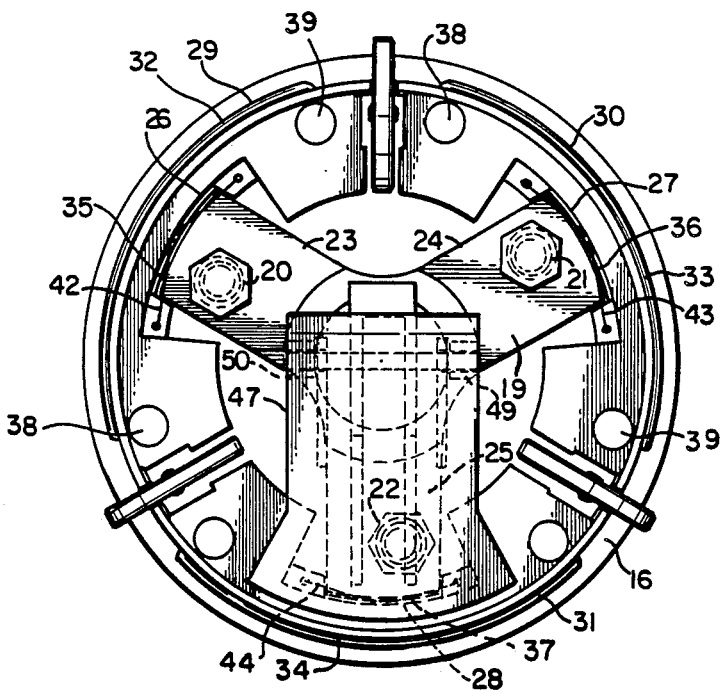
FIG. 3 is an end view of the file reel hub on the line 3—3 of FIG. 2.
Figure 2:
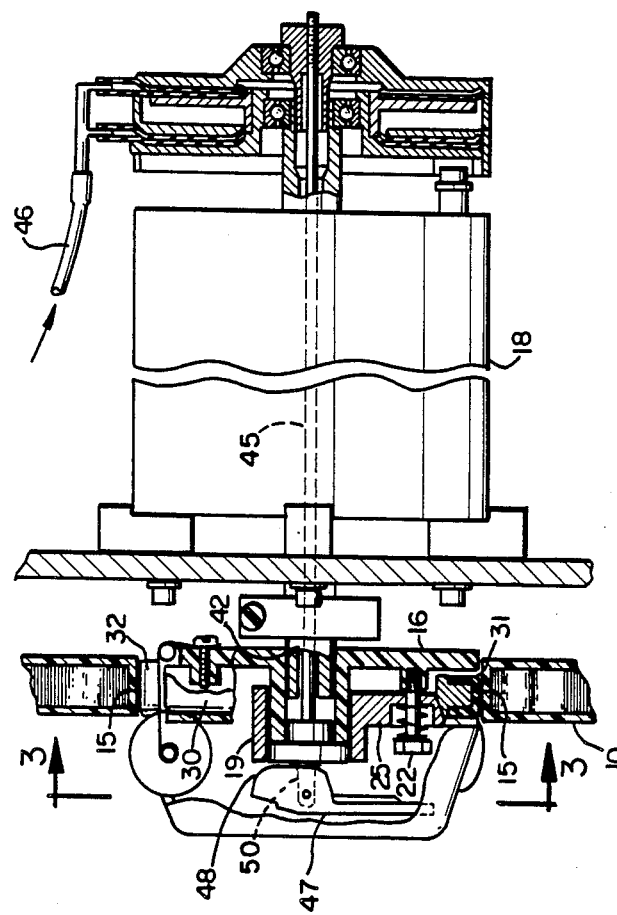
FIG. 2 is a cross-sectional view of the file reel, mounting hub, and actuator, taken along the line 2—2 of FIG. 1.
Figure 4:
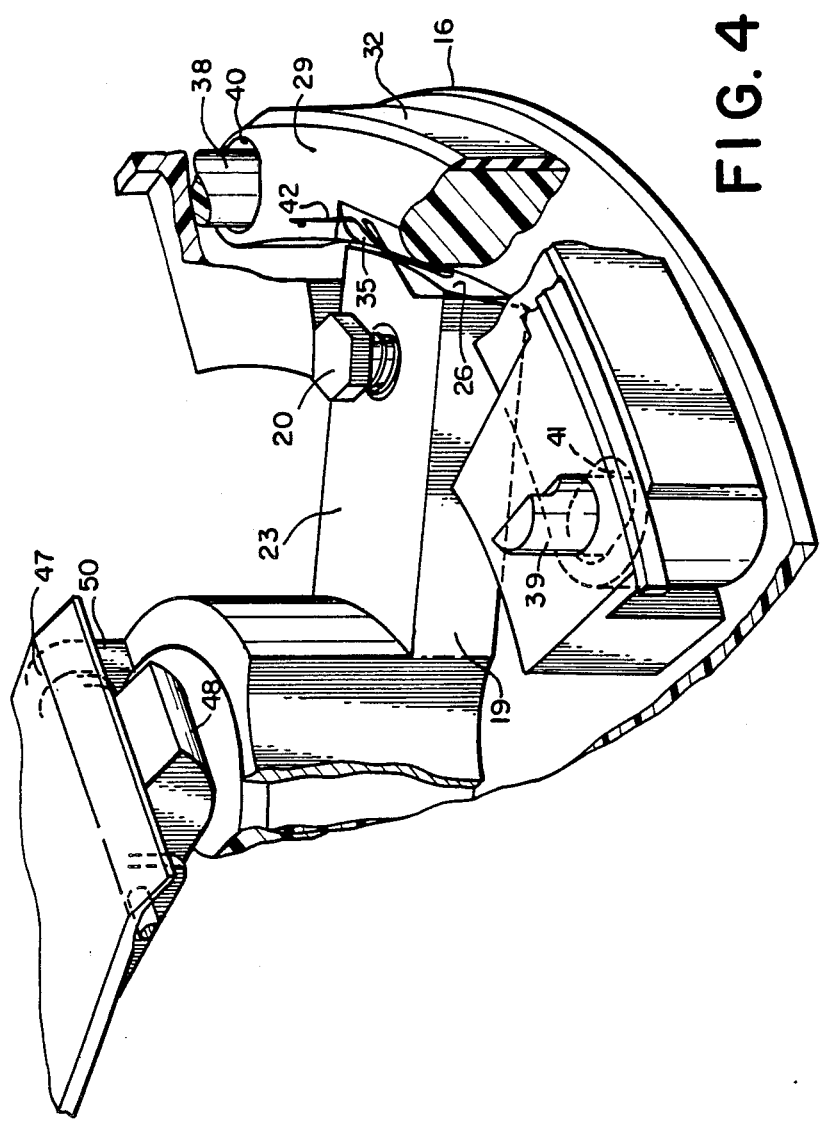
FIG. 4 is a perspective view of a portion of the locking mechanism.

FIGS. 2-4 show the locking hub of the present invention. File reel 10 has an annular opening with a circular peripheral surface 15 in the center. The locking hub includes a circular hub frame 16 rotatably mounted by the shaft 17 of the reel motor 18. The circular hub frame 16 fits within the annular opening of the file reel.

The locking actuator includes an end piece 19 and three guiding bolts 20-22 slidably mounting the end piece 19 in the hub frame 16. The guiding bolts extend through fingers 23-25 of end piece 19. Inclined camming surfaces 26-28, at the end of a respective finger 23-25, extend radially as the end piece 19 is moved axially.

Three arcuate locking members 29-31 are enclosed within the frame 16. Each locking member 29-31 has a respective circumferential surface 32-34 which matches the circular peripheral surface in the center of the file reel.

Circumferential surfaces 32-34 are of a friction material such as silicon rubber. Each of the circumferential surfaces 32-34 engage the circular peripheral surface of the file reel through almost 120°. Therefore, the locking members engage the peripheral surface of the file reel through almost 360°, the only exception being the three spaces between the locking members.

A rounded cam surface 35-37 is at the center of a respective locking member 29-31. Rounded cam surfaces 35-37 mate with the inclined camming surfaces 26-28 respectively on the actuator. When the actuator moves axially, the mating cam surfaces move the locking members radially outward.

This motion is guided. Two guides such as 38 and 39 are provided for each locking member. The guides extend through frame 16 and through slots such as 40 and 41, in each locking member. This arrangement guides the locking members in a radial movement.

When the end piece 19 is moved axially, camming surfaces 26-28 extend radially outward. This moves the arcuate locking members radially outward so that the entire circumferential surface of the locking member engages the peripheral surface 15 of the reel. This provides a good locking engagement between the hub and the reel.

Spring clips 42-44 extend between frame 16 and the corresponding locking member to bias the locking member inwardly and retain the locking member in the frame. Each locking member is moved radially outward against the bias by the camming surfaces of the actuator.

The actuator is moved axially by a pneumatically driven rod 45 (for automatic hubs), or manually operated latch 47 (for manual hubs). The rod 45 is moved axially outward by the pneumatic drive means of the aforementioned Smith patent which is supplied with pressurized air through inlet 46. Alternatively the hub is locked in place by operating the locking lever 47. Locking lever 47 has a camming surface 48 which engages a portion of the frame 16 to move the end piece 19 axially. This manually locks the hub to the reel. Locking lever 47 is pivoted at 49 to rotatably mount it in the end piece 19.

While a particular embodiment of the invention has been shown and described, various modifications are within the true spirit and scope of the invention. The appended claims are, therefore, intended to cover all such modifications.

What is claimed is:

1. In a magnetic tape drive of the type in which magnetic tape is driven between a file reel and a machine reel past a magnetic read/write head, an improved locking hub for a file reel having an annular opening with a circular peripheral surface in the center thereof, said locking hub comprising:
   a circular hub frame rotatably mounted on said drive for rotating said file reel, said circular hub frame fitting within the annular opening of said file reel;
   an actuator having camming surfaces which lock and unlock said hub as said actuator is moved axially with respect to said frame;
   a plurality of arcuate locking members within said frame, said locking members having circumferential surfaces of a friction material, said circumferential surfaces matching the circumferential surface at the center of said file reel;
   a cam surface at the center of each of said locking members, said cam surface at the center of each locking member mating with the camming surfaces on said actuator; and
   guides extending through said frame and through slots in said arcuate locking members to guide said locking members in a radial movement so that said friction material of the circumferential surfaces of said locking members engage the peripheral surface at the center of said locking hub substantially completely around the periphery thereof.

2. The locking hub recited in claim 1 wherein three arcuate locking members have circumferential surfaces which each engage the circular peripheral surface of said file reel throughout almost 120°.

3. The locking hub recited in claim 1 wherein said friction material is silicon rubber.

4. The locking hub recited in claim 1 further comprising:
   a spring clip for each locking member, said spring clip extending between said frame and the locking member to bias the locking member radially inward to retain said locking member in said frame, each locking member being moved radially outward against said bias by the camming surfaces of said actuator to lock said hub.

5. The locking hub recited in claim 1 wherein said actuator includes an end piece, and guides slidably mounting said end piece in said frame for axial motion, said inclined camming surfaces of said actuator being at the end of said fingers of said end piece.

6. The locking hub recited in claim 5 further comprising:
   a pneumatically driven actuator rod for moving said end pie axially to lock said hub.

7. The locking hub recited in claim 5 further comprising:
   a locking lever pivoted in said end piece, said locking lever having a camming surface which engages said frame to move said end piece axially to manually lock said hub.

8. The magnetic tape drive recited in claim 1 wherein the camming surfaces on said actuator are inclined surfaces which extend radially as said actuator moves axially.

9. The magnetic tape drive recited in claim 1 wherein the cam surface at the center of each locking member is rounded.

* * * * *